United States Patent
Williams et al.

(10) Patent No.: US 7,205,997 B1
(45) Date of Patent: Apr. 17, 2007

(54) TRANSPARENT VIDEO CAPTURE FROM PRIMARY VIDEO SURFACE

(75) Inventors: Ian M. Williams, Menlo Park, CA (US); Thomas True, Los Gatos, CA (US); Adrian Muntianu, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 213 days.

(21) Appl. No.: 10/951,497

(22) Filed: Sep. 28, 2004

(51) Int. Cl.
*G09G 5/00* (2006.01)

(52) U.S. Cl. .................................... 345/582

(58) Field of Classification Search ............... 345/538, 345/539, 541, 545, 546, 547, 548, 552, 569, 345/582, 583, 584, 586, 587, 603, FOR. 118, 345/FOR. 211; 348/14 R, 128, 389.1, 432.1, 348/441, 467, 716, FOR. 144, FOR. 152
See application file for complete search history.

(56) References Cited

U.S. PATENT DOCUMENTS

| | | | |
|---|---|---|---|
| 6,229,553 B1 * | 5/2001 | Duluk et al. ................. | 345/506 |
| 6,407,736 B1 * | 6/2002 | Regan ......................... | 345/422 |
| 6,937,245 B1 * | 8/2005 | Van Hook et al. ........... | 345/546 |
| 2002/0009293 A1 * | 1/2002 | Aldrich ....................... | 386/123 |
| 2002/0118762 A1 * | 8/2002 | Shakiba et al. .............. | 375/240.28 |
| 2003/0156649 A1 * | 8/2003 | Abrams, Jr. ................. | 375/240.24 |
| 2003/0222892 A1 * | 12/2003 | Diamond et al. ........... | 345/647 |

* cited by examiner

*Primary Examiner*—Mark Zimmerman
*Assistant Examiner*—G. F. Cunningham
(74) *Attorney, Agent, or Firm*—Patterson & Sheridan, LLP

(57) ABSTRACT

A method and system for converting an image data generated by a graphics subsystem into a video format. In one embodiment, the method includes generating the image data, storing the image data in a buffer, capturing the buffer to convert the image data to a texture, mapping the texture to at least one polygon to create a formatted image, and converting the formatted image to a stream of data in the video format.

21 Claims, 4 Drawing Sheets

TRANSPARENT VIDEO CAPTURE FROM PRIMARY VIDEO SURFACE

BACKGROUND OF THE INVENTION

1. Field of the Invention

One or more embodiments of the present invention generally relate to an apparatus and method for enhancing graphics generated by a graphics processor unit ("GPU"), and more particularly, to an apparatus and method for converting the format of computer-generated images.

2. Description of the Related Art

With the introduction of the graphics processor unit ("GPU"), computationally intensive calculations for generating graphics, which were traditionally performed by a central processing unit ("CPU"), have been offloaded to the GPU. The GPU has enabled computer workstations to become more integrated in generating sophisticated digital content creation and performing other video processing tasks, including editing (e.g., nonlinear editing) and creating special effects for video images.

Media creators, such as film makers, photographers, television broadcasters, and even medical imaging professionals often require that GPU-generated graphics and ancillary video signals be produced and transported at a high definition resolution. "High definition" typically refers to images having a resolution such as 1920 horizontal pixels by 1080 vertical pixels, regardless if interlaced or progressively scanned. To integrate graphics into real-time video broadcasts and/or and post-production video processing, these creators of content are using various converters and devices, such as serial digital interface ("SDI") converters, to generate video images at high-definition resolutions from GPU-generated images.

An SDI converter is a device for converting computer-generated images into uncompressed standard-definition SDI and high-definition SDI video formats. An SDI converter generally provides for improved HD imaging over traditional scan converters by receiving 8-bit color components via a high-speed serial interface especially designed to transport pixel data over channels connecting the SDI converter to the GPU. Each channel typically includes three data channels for transporting 8 bits of the red component over a first data channel, 8 bits of the green component over a second data channel, and 8 bits of the blue component over the third data channel, thereby providing 24 bits of pixel data in RGB color space format.

Digital Visual Interface ("DVI") is an example of such a high-speed interface. A DVI is designed to transport pixel data using transition minimized differential signaling ("TMDS"), which encodes each 8-bit color component into a 10-bit transition minimized signal, adding two bits of control information. By using TMDS, each DVI channel enables their three, 8-bit data channels to provide the RGB information currently at a bandwidth of 165 MHz. Generally, the fundamental principles of TMDS are well-known and need not be discussed in detail.

One drawback to this approach is that the throughput of bits is generally limited to 8-bits per data channel and/or one color component (i.e., R, G, or B) per data channel. This, in turn, limits the amount and the form in which pixel data can be transported during a given time interval. Another drawback to this implementation is that when generating HD video, SDI formatting typically requires that each 8-bit RGB color component be converted to, for example, a 10-bit YCrCb color component. Without the increased resolution provided by the additional 2 bits of the YCrCb color space format, the video generated at the SD/HD-SDI output by the SDI converter is suboptimal. That is, a video generated by the SDI converter lacks the resolution to smooth the graduations of colors, such as from a dark-colored background to a lighter-colored background, to avoid producing a perceptible color banding or a set of "stair-stepped" contour lines betweens the graduations of colors.

Therefore, a need exists in the art for an improved method and apparatus for converting computer-generated images into uncompressed standard-definition SDI and high-definition SDI video formats.

SUMMARY OF THE INVENTION

One or more embodiments of the invention are directed to a method for converting an image data generated by a graphics subsystem into a video format. In one embodiment, the method includes generating the image data, storing the image data in a buffer, capturing the buffer to convert the image data to a texture, mapping the texture to at least one polygon to create a formatted image, and converting the formatted image to a stream of data in the video format.

In another embodiment, the method includes obtaining the image data, storing the image data as a texture and rendering at least one polygon using the image data. The at least one polygon has a plurality of vertices associated with a plurality of texture coordinates. The method further includes formatting the image data with a precision greater than as provided by an 8-bit per red-green-blue ("RGB") color component.

In yet another embodiment, the method includes receiving one or more commands to generate an image data, generating the image data in response to receiving the commands, storing the image data in a scanout buffer, capturing the scanout buffer to convert the image data to a texture, mapping the texture to at least one polygon to create a formatted image, and converting the formatted image to a serial digital interface format.

One or more embodiments of the invention are also directed to a graphics system, which includes a graphics subsystem having a scanout buffer. The graphics subsystem is configured to generate an image data, store the image data in the scanout buffer, use the scanout buffer as a texture, and map the texture to at least one polygon to create a formatted image. The graphics system further includes an image converter coupled to the graphics subsystem. The image converter is configured to convert the formatted image to a stream of data in a serial digital interface format.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
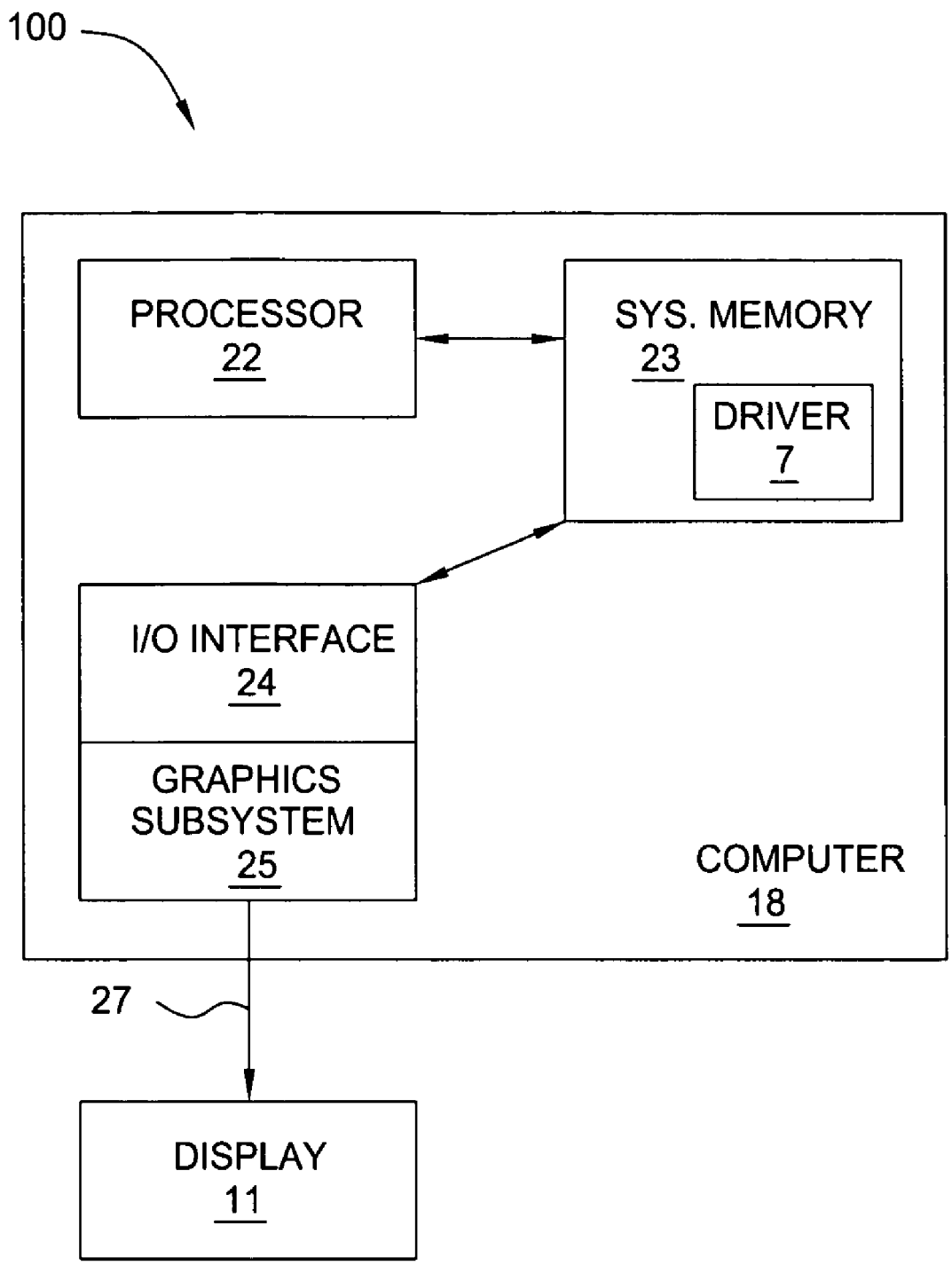
FIG. 1 illustrates a block diagram of an exemplary computer system that may be used in connection with one or more embodiments of the present invention.

FIG. 1 illustrates a block diagram of an exemplary computer system 100 that may be used in connection with one or more embodiments of the present invention. The computer system 100 includes a computer 18, which has a processor 22, a system memory 23, an input/output (I/O) interface 24 and a graphics subsystem 25. The processor 22 is coupled to the system memory 23 and the I/O interface 24. The system memory 23 may be programmed with all or a portion of a driver program 7 for executing instructions in accordance with one or more embodiments of the present invention as described below in more detail.

The I/O interface 24 may be coupled to the system memory 23 for direct memory addressing (DMA). Though the computer 18 may be programmed to carry out graphics oriented processing without a separate device for graphics processing, a more efficient use of the processor 22 is to have a separate device for graphics processing. Accordingly, the graphics subsystem 25 may be coupled to the I/O interface 24 in a known manner. Such graphics subsystems are well known, and often take the form of a "card." Moreover, in some instances, a graphics chip set is implemented on a motherboard, and thus no separate graphics card is used, or an optional separate graphics card can still be used, even if motherboard chips perform graphics functions.

The graphics subsystem 25 may have an output 27 provided to a display 11, such as a computer monitor, a projector or a television monitor and the like. In some instances, multiple display devices (e.g., an array of projectors or CRT monitors) may be supported, with each device displaying a portion of the image data.

It will be appreciated that the computer system 100 is illustrative and that variations and modifications are possible. The computer system 100 may be a desktop computer, server, laptop computer, palm-sized computer, tablet computer, game console, set-top box, personal digital appliance, tethered Internet appliance, portable gaming system, cellular/mobile telephone, computer based simulator, or the like. The graphics subsystem 25 or any of its components may be implemented using one or more programmable processors programmed with appropriate software, application specific integrated circuits (ASICs), other integrated circuit technologies, or any combination of these. In view of the present disclosure, persons of ordinary skill in the art will recognize that the present invention can be embodied in a wide variety of system configurations.

Figure 2:
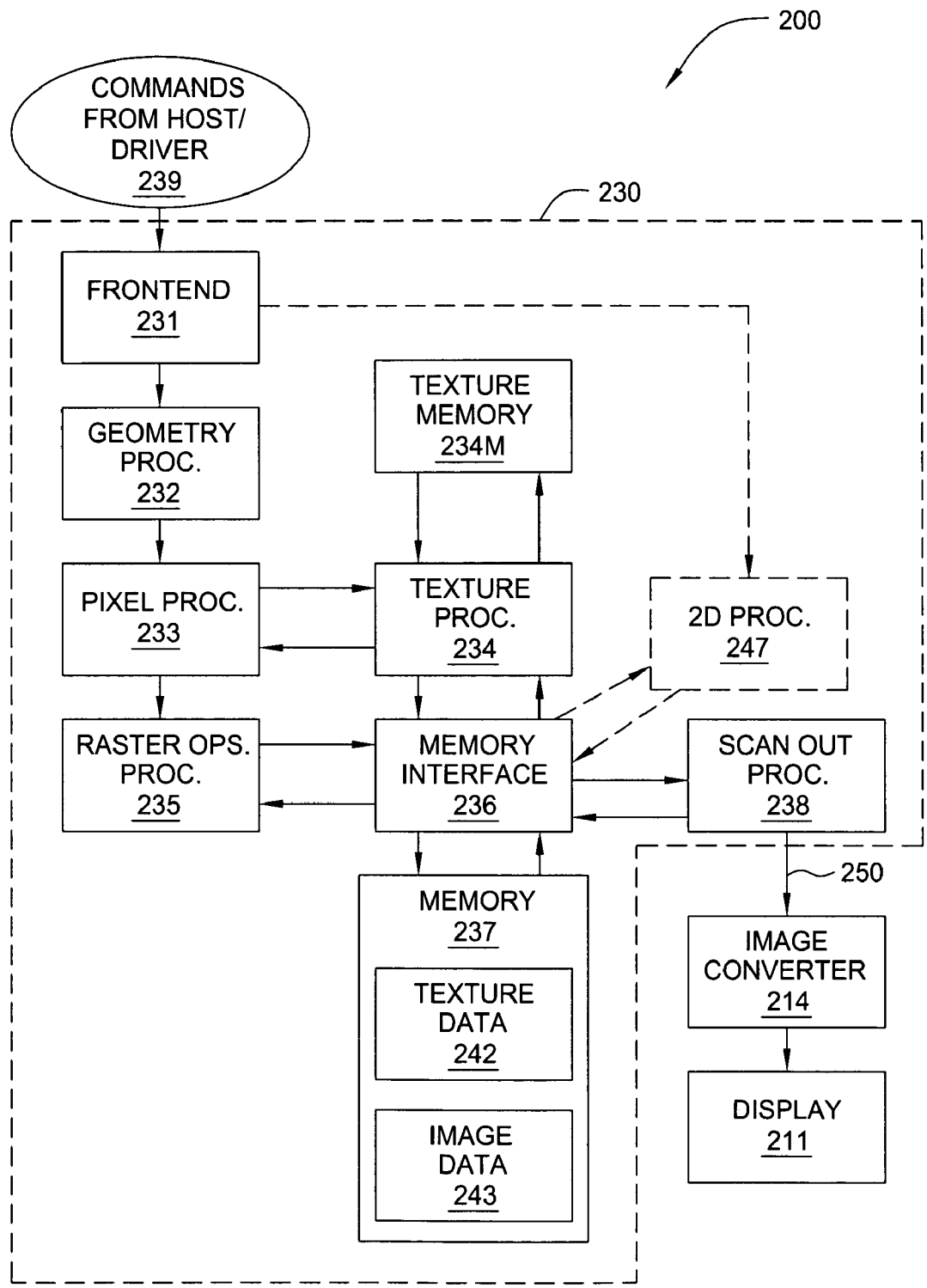
FIG. 2 illustrates a block diagram of a computer system in accordance with one or more embodiments of the present invention.

FIG. 2 illustrates a block diagram of a computer system 200 in accordance with one or more embodiments of the present invention. The computer system 200 includes a graphics subsystem 230, which may be accessed by application programs via an Application Program Interface (API), such as OpenGL®, D3D®, and Direct Draw®. For purposes of clarity, the graphics subsystem 230 is described as implemented in hardware, though a combination of hardware and software may be used. The graphics subsystem 230 may include a frontend 231, a geometry processor 232, a pixel processor 233, a texture processor 234, a raster operations processor 235, a memory interface 236, a memory 237, a scan out processor 238, and optionally a two-dimensional (2D) processor 247. In addition, the texture processor 234 may include a memory interface for communicating with a separate texture memory. In one embodiment, the scan out processor 238 is coupled to the display 211 through an image converter 214.

In operation, commands 239 are received from a host computer, such as the computer 18. Such commands 239 may be made through a driver, such as the driver 7, for the graphics subsystem 230. That is, commands 239 are fed into the graphics subsystem 230 to generate an image characterized by an image data 243, which is stored in the memory 237, which may often be referred to as frame buffer or primary video surface. Commands 239 may be in response to a program application, an operating system or other computer program having an image to be displayed. Commands 239 may also indicate a range of addresses for the memory 237 in which to write the generated image data 243. Furthermore, display lists, which are commands that are bundled together and invoked by another command, may be used in generating the image data 243.

The frontend 231 manages DMA, buffering commands and the like for the geometry processor 232. The geometry processor 232 processes polygons and performs transforms, such as translation, scaling, rotation, field-of-view, and depth test near and far field clipping, among others, for such an image to be made. The pixel processor 233 associates data to pixels for such an image 243 to be made.

The texture processor 234 generates texture values from texels stored as texture data 242, which may be stored in the graphics subsystem memory 237, the texture memory 234M, or of system memory 23. The texture processor 234 performs interpolation, including but not limited to nearest, bilinear, trilinear and anisotropic interpolation amongst texels. Interpolation of texture coordinates, used to select texels for interpolation, includes plane equation and barycentric. Because some texel values are reused, the texture processor 234 may cache texels to reduce repetitive reads from memory. Optionally, one or more coarser resolutions of image data 243 may be generated, for use in interpolation.

The raster operations processor 235 may blend, perform logic operations, and other known operations for such pixels. The memory interface 236 receives image data 243, in the form of pixel values and writes it to the graphics subsystem memory 237. Alternatively, commands 239 may be provided to the 2D processor 247 to generate the image data 243 and store it in the memory 237 via the memory interface 236.

The texture data 242 is obtained from the image data 243 and written to the memory 237. Optionally, the image data 243 may be copied for creation of the texture data 242. The image data 243 includes mapping of polygons, where each polygon has vertices. Coordinates of these vertices, or coordinates related to these vertices, may be stored as texture coordinates.

The graphics subsystem 230 may be coupled to the image converter 214 via an image interface 250, which may include one or more DVI-configured transmitter and receiver modules using TMDS encoding for data transport over the image interface 250. For example, the image interface 250 can transport RGB information as 8-bit color components over each of three data channels. In another embodiment, the image interface 250 may be configured to transport 10-bit RGB color components by distributing the 10 bits of each component over two or more TMDS-encoded data channels. In other embodiments, each 10-bit RGB color component (i.e., 10-bit red component, etc.) may be transported over each DVI link without using TMDS encoding.

In this instance, two bits that are reserved for controlling data transfer in accordance with TMDS are used to transport the extra two bits of an RGB color component.

In yet another embodiment, the image interface 250 may be configured to transport different types of image data such as pixel data in color space formats other than RGB (e.g., YCrCb 4:4:4, or the like). Other types of image data may include alpha-blending ("alpha") data and depth ("Z") data, or the like. These data are communicated from at least one DVI-configured transmitter module to at least one DVI-configured receiver module using TMDS encoding. In still yet another embodiment, such image data may be transported from the graphics subsystem 230 to the image converter 214 without using TMDS encoding, thereby using more than 8 bits for transporting one or more of the different types of image data. The image interface 250 may be implemented in hardware, software, or in a combination thereof. A more detailed description of the image interface 250 may be found in commonly assigned U.S. patent application Ser. No. 10/741,811 (NVDA/P000800), entitled Apparatus and Method for Generating Serial Digital Video Using a Graphics Processing Unit, filed on Dec. 18, 2003, which is incorporated herein by reference.

The image converter 214 may be configured to receive data from the image interface 250 to at least generate video in an HD-SDI format as a "fill" signal at a fill output. The image converter 214 may also implement alpha data to generate a signal representing a "key" image at an alpha output. In addition, the image converter 214 may use Z data to generate a signal representing Z information at a "Z" output, where Z information is used to form, for example, three-dimensional composites. These signals are suitable for communication to an external device (e.g., a video mixer device) that uses such video images to create further video images through techniques, such as compositing multiple images together based upon key data. In another embodiment, the image converter 214 may include one or more source video inputs for receiving, for example, SDI-formatted video images, and a mixer for mixing two or more video images to form an HD-composited video image. In one embodiment, the image converter 214 or its equivalent functionality may be implemented in a field programmable gate array ("FPGA") integrated circuit or in a semiconductor device (e.g., such an application-specific integrated, or 'ASIC,' device, or the like). In at least one embodiment, the image converter 214 is configurable to provide video in the SD-SDI format as well as the HD-SDI. A more detailed description of the image converter 214 may be found in commonly assigned U.S. patent application Ser. No. 10/741,811 (NVDA/P000800), entitled Apparatus and Method for Generating Serial Digital Video Using a Graphics Processing Unit, filed on Dec. 18, 2003, which is incorporated herein by reference.

Returning to the system level, system 200 may include fewer elements than shown in FIG. 2. Alternatively, system 200 may include other well-known elements than shown in FIG. 2. Further, system 200 may be integrated into a computer workstation, a portable computer, or any other computing device suitable for generating HD video images. In one embodiment, the graphics subsystem 230 and the image converter 214 may each be implemented in separate packaged integrated circuits ("ICs") mounted on either a single printed circuit board ("PCB") or on multiple PCBs. In one instance, a graphics card includes the graphics subsystem 230 as a packaged IC mounted on a PCB, upon which is affixed a "daughter board" as a second, electrically coupled PCB. Mounted on the daughter board is the image converter 214 as another packaged IC. In another embodiment, one or more functions of the image converter 214 may be included in the graphics subsystem 230. In yet another embodiment, the image converter 214 may be integrated into the graphics subsystem 230 such that the image converter 214 and the graphics subsystem 230 are combined into a single IC having a common substrate (e.g., silicon semiconductor substrate).

Figure 3:
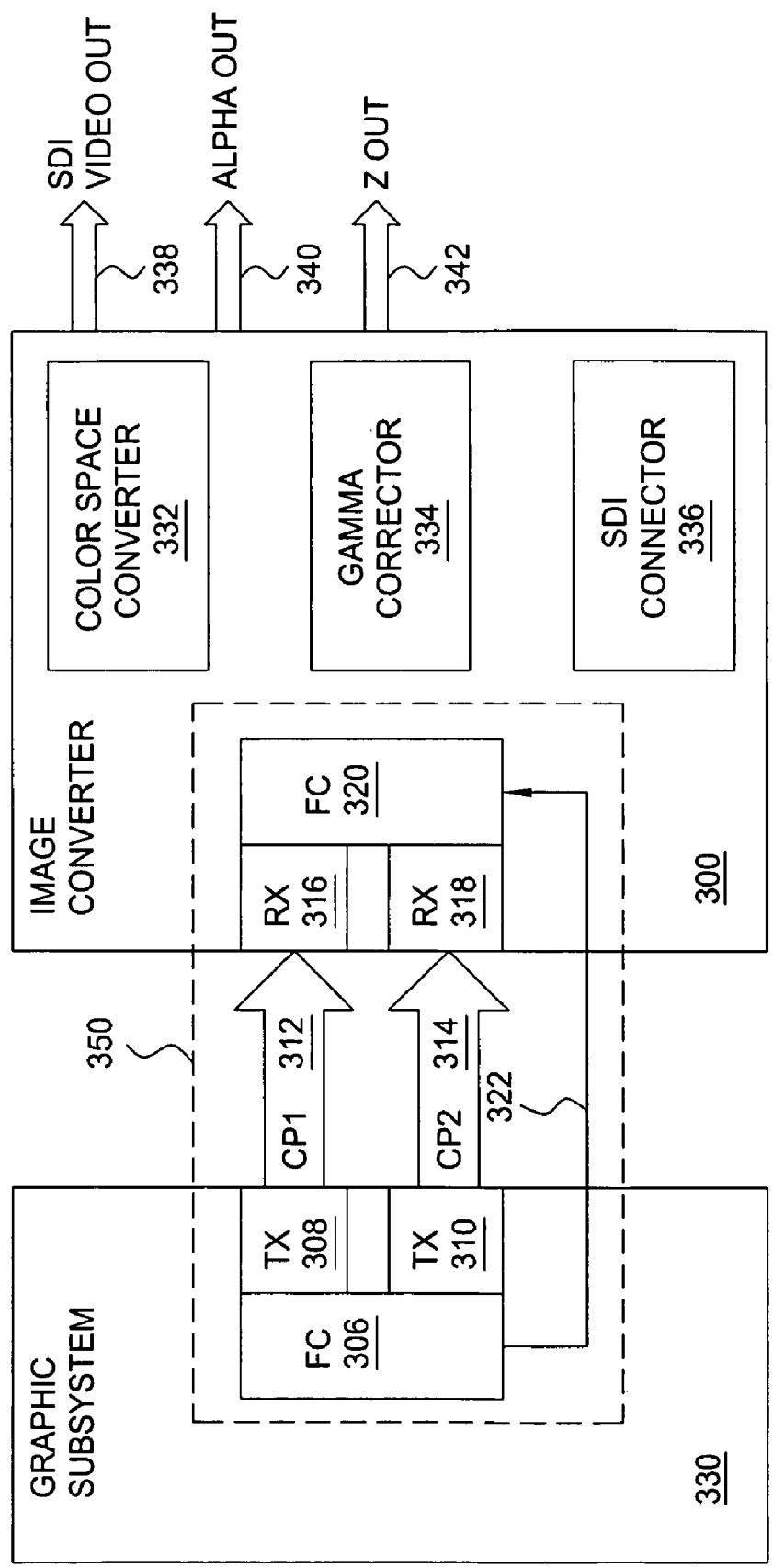
FIG. 3 illustrates a block diagram of an image converter coupled to a graphics subsystem according to one or more embodiments of the present invention.

FIG. 3 illustrates a block diagram of an image converter 300 coupled to a graphics subsystem 330 according to one or more embodiments of the present invention. The graphics subsystem 330 is configured to provide image data to the image converter 300, which in turn, generates signals representing at least HD-SDI video at an SDI video output 338, alpha information at an alpha output 340, depth information at a Z output 342, and other like imaging information. Alpha information and depth information may refer to SDI-formatted alpha data and Z data, respectively. Graphics subsystem 330 has some or all of the functionalities of graphics subsystem 230 of FIG. 2. The image data is typically output onto a bus from one or more output ports of the graphics subsystem 330.

The image interface 350 is configured to transport the image data from graphics subsystem 330 to the image converter 300. The image interface 350 includes one or more communication paths, and a transmitter module ("TX") and a receiver ("RX") module for each of the communication paths. The image interface 350 also includes two communications paths, CP1 312 and CP2 314. In one embodiment, CP1 312 and CP2 314 utilize one or more output ports of graphics subsystem 330. In another embodiment, the one or more output ports of graphics subsystem 330 are integrated with the image interface 350. These output ports can provide some or all of the image data that is to be transported over CP1 and/or CP2 (or other communication paths not shown). When operating as a DVI link, each communication path transports 8 bits of image data (plus 2 control bits) over each of three data channels. These communications path may be composed of wire, such as "wires" on an integrated circuit or "traces" on a PCB, coaxial cable, or any other conductor for carrying electronic signals. But these paths may also be adapted to carry optical and electromagnetic (e.g., wireless signals), or any other type of signal.

In this example, each communication path is associated with a TX module and a RX module. Here, communications paths CP1 312 and CP2 314 are associated respectively with TX module 308 and RX module 316 and TX module 310 and RX module 318. TX modules 308 and 310 may be similar in structure and/or function. For instance, TX modules 308 and 310 may each be DVI-configured transmitter modules operating in accordance with TMDS encoding.

In one embodiment, TX modules 308 and 310 may each be configured to transport 24 bits of image data in either a single-link mode or 48 bits in a dual-link mode, or both. According to TMDS, a TX module operating in single-link mode may transmit 24 bits of information at one point in time, or per clock, whereas a TX module operating in dual-link mode may transmit 48 bits of information at one point in time. In other instances, TX modules 308 and 310 may be DVI-configured transmitter modules operating without TMDS encoding (e.g., by using 10 bits, which includes the 2 bits generally used for TMDS data control). Yet in other instances, TX modules 308 and 310 may be non-DVI transmitter modules.

However, TX modules 308 and 310 may also be structurally and/or functionally dissimilar in their use of TMDS encoding, data throughput capabilities, types of image data transported. Dissimilar data throughput capabilities may be due to a different number of bits or due to the manner in which the bits are transported.

The image interface 350 includes one or more optional format converters to format the image data for optimal transport over the one or more communications paths. More specifically, the image interface 350 includes format converters ("FC") 306 and FC 320. In this example, FC 306 is, in part, an interface between graphics subsystem 330 and TX modules 308 and 310. FC 306 receives image data from, for example, one or more output ports in a form specific to graphics subsystem 330, and formats the image data for optimal transport via TX modules 308 and 310 over either CP1 312 or CP2 314, or both. FC 320 operates in a similar, but reverse manner to format the image data from the form used to transport CP1 and/or CP2 into one or more forms useable by the image converter 300 for further processing.

In one embodiment, FC 306 is coupled via optional format signals 322 to FC 320. Format signals 322, which may be transported over CP1 312 and CP2 314, include one or more signals for indicating the formats with which the image data is formatted, for controlling image data transport, and for indicating which types of image data are transported (e.g., pixel, alpha and/or Z), and any other signal for practicing one or more embodiments of the present invention.

FC 306 of the image interface 350 is configured to receive the image data generated by graphics subsystem 330. This image data can be in HD or like resolutions, and can include pixel, alpha, Z or other like data. Further, FC 306 is configured to optionally receive a prioritization listing that indicates to FC 306 which types of image data are most to least important for video processing (e.g., which image data should be transported and processed first, second, third, etc.) In some embodiments, graphics subsystem 330 can generate the prioritization listing. Then, FC 306 formats the image data in accordance with the prioritization listing to support video processing by the image converter 300. FC 306 is designed to configure the one or more transmitter modules, such as TX modules 308 and 310, as a DVI (or a non-DVI) transmitter to use TMDS (or non-TMDS) encoding for transmitting the image data over one or more communication paths (e.g., CP1 and/or CP2) and/or at different points in time.

The image converter 300 may include various imaging processing modules and/or circuits, such as a color space converter 332, a gamma corrector 334, an SDI converter 336 and one or more miscellaneous modules. The color space converter 332 may be used to convert, for example, one color space format represented by pixel data (e.g., RGB, YUV, CMYK, YIQ, etc.) into another color space format (e.g., YCrCb, etc.). The gamma corrector 334, for example, processes pixel data (e.g., representing RGB color-spaced images) to compensate for the nonlinear characteristics required to adjust the brightness of a displayed pixel. The SDI converter 336 encodes the image data into a SDI format, such as an HD-SDI format. One or more miscellaneous modules are included to implement additional functionalities, like enhancing video by compositing or scaling images for output as HD-SDI video. The image converter 300 is configured to generate signals representing HD-SDI video images at SDI Video output 338, alpha information at alpha output 340, Z information at Z info output 342, and the like. In some embodiments, the color space converter 332 and gamma corrector 334 are optional if the image data are associated with a color space format that does not require the use of these elements of the image converter 300. For example, if the image data generated by graphics subsystem 330 is formatted using the YCrCb color space, then the color space converter 332 may not be necessary. That is, there would be no need to convert from RGB to YCrCb.

Figure 4:
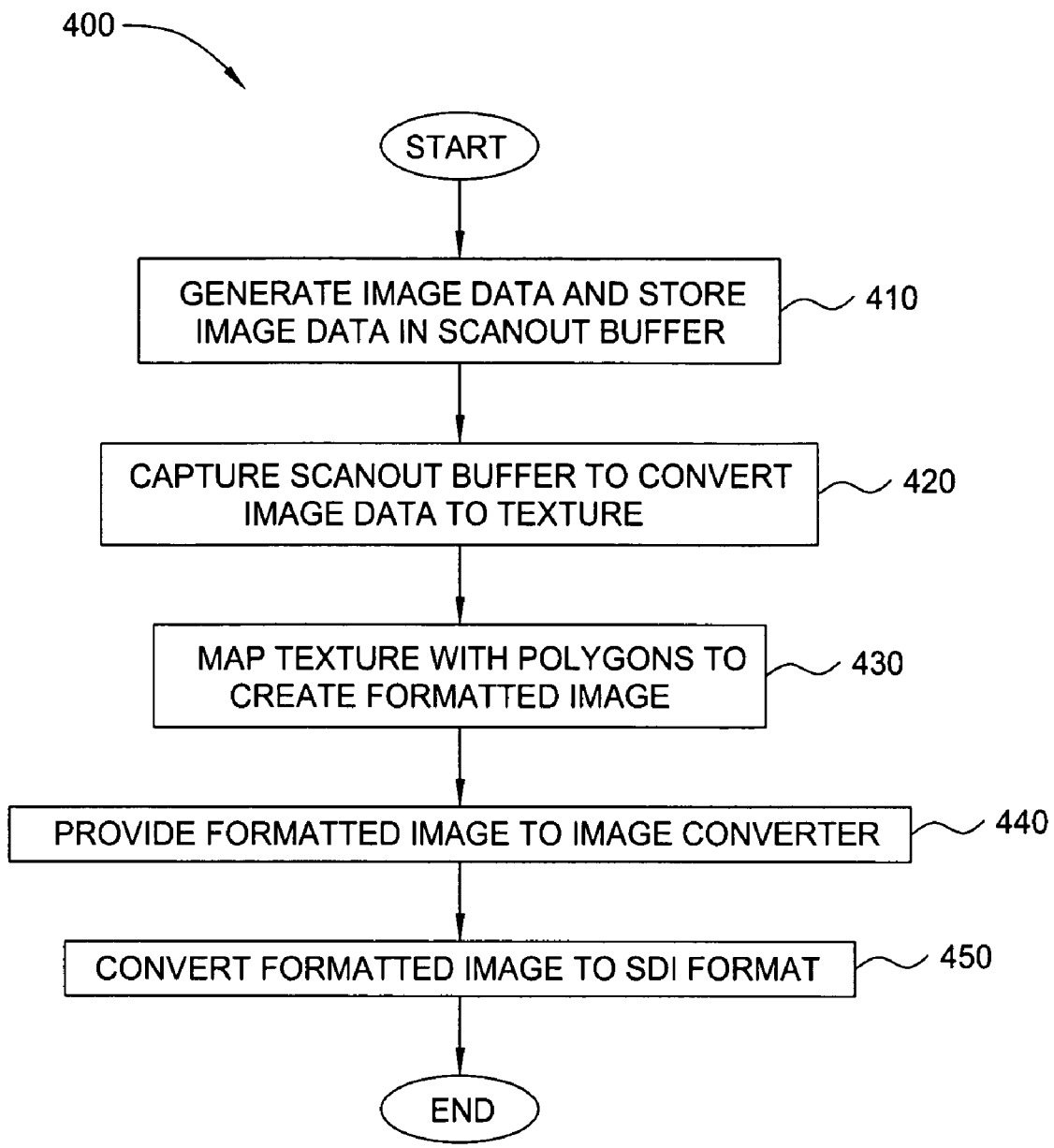
FIG. 4 illustrates a flow diagram of a method for converting image data generated by a graphics subsystem into a video format.

FIG. 4 illustrates a flow diagram of a method 400 for converting image data generated by a graphics subsystem into a video format, such as SDI format. At step 410, the image data is generated by the graphics subsystem, such as graphics subsystem 230 and stored in memory, scanout buffer or primary video surface, such as memory 237. The image data may be generated in response to the commands, such as commands 239, received by the graphics subsystem in response to a program application, operating system or other computer program having an image to be displayed. The image data may be any number of bits, e.g., 16 or 32 bit floating point data. At step 420, the scanout buffer is captured in order to convert the image data to texture. Alternatively, the image data may be stored as texture. In one embodiment, the image data may be used by fragment shaders to perform color conversion and scaling. In another embodiment, the capture of the scanout buffer is synchronized or timed to avoid tearing. In yet another embodiment, geometric distortion may be applied on the image data. At step 430, the texture is mapped with polygons to create a formatted image. In one embodiment, the image data are applied to the polygons as a texture, wherein the polygons have vertices that are associated with texture coordinates. In another embodiment, the image data is applied as a texture to a single polygon. As commonly known in the art, a single polygon may be a triangle.

At step 440, the formatted image is provided to the image converter, such as image converter 300. At 450, the image converter converts the formatted image to a video format, such as SDI format. In one embodiment, the formatted image is converted to a stream of data in the SDI format or another video format generally known by persons of ordinary skill in the art. In another embodiment, the formatted image is converted into an image having a precision greater than as provided by an 8-bit per red-green-blue ("RGB") color component, and the formatted image is transported to the SDI converter for generating a high-definition video in an SDI format. The formatted image may be formatted by disabling TMDS and formatting the image as a 10-bit per color component, wherein the 10-bit color component is transported on a single DVI link. In this manner, the image data may be transparently converted to the SDI format.

One or more embodiments of the present invention may relate to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the foregoing is directed to embodiments of the present invention, other and further embodiments of the invention may be devised without departing from the basic scope thereof, and the scope thereof is determined by the claims that follow.

What is claimed is:

1. A method for converting an image data generated by a graphics subsystem into a video format, comprising:
   generating the image data;
   storing the image data in a buffer;
   capturing the buffer to convert the image data to a texture;
   mapping the texture to at least one polygon to create a formatted image;
   converting the formatted image to a selectively encoded stream of data in any one of a plurality of video formats;
   providing the encoded data to an image converter which generates signals representing at least HD-SDI at an SDI video output, alpha information at an alpha output and depth information at a Z-output.

2. The method of claim 1, wherein the video format is a serial digital interface format.

3. The method of claim 1, wherein the buffer is a scanout buffer.

4. The method of claim 1, further comprising performing one of color conversion and scaling operation on the texture.

5. The method of claim 1, further comprising applying a geometric distortion on the image data.

6. The method of claim 1, wherein capturing the buffer comprises storing the image data as a texture.

7. The method of claim 1, wherein mapping the texture comprises applying the image data to the at least one polygon, wherein the at least one polygon comprises a plurality of vertices associated with a plurality of texture coordinates.

8. The method of claim 1, wherein converting the formatted image comprises formatting an image having a precision greater than as provided by an 8-bit per red-green-blue ("RGB") color component.

9. The method of claim 1, wherein converting the formatted image comprises:
   formatting an image having a precision greater than as provided by an 8-bit per red-green-blue ("RGB") color component; and
   transporting the formatted image to a serial digital interface ("SDI") converter for generating the high-definition video in an SDI format.

10. The method of claim 1, wherein formatting the image comprises transporting a 10-bit per color component of the formatted image on a digital visual interface link.

11. The method of claim 1, further comprising receiving one or more commands from one of a program application and an operating system.

12. The method of claim 1 wherein the selectively encoded video format is chosen to optimize transport of the stat to the image converter.

13. A method for converting an image data generated by a graphics subsystem into a video format, comprising:
   obtaining the image data;
   storing the image data as a texture;
   rendering at least one polygon using the image data, wherein the at least one polygon has a plurality of vertices associated with a plurality of texture coordinates;
   formatting the image data into one of a plurality of selectable encoded stream data with a precision greater than as provided by an 8-bit per red-green-blue ("RGB") color component; and
   providing the encoded data to an image converter which generates signals representing at least HD-SDI at an SDI video output, alpha information at an alpha output and depth information at a Z-output.

14. The method of claim 13, wherein formatting the image data comprises transporting a 10-bit per color component of the formatted image on a digital visual interface link.

15. The method of claim 13 wherein the selectively encoded video format is chosen to optimize transport of the stat to the image converter.

16. A method for converting an image data generated by a graphics subsystem into a video format, comprising:
   receiving one or more commands to generate an image data;
   generating the image data in response to receiving the commands;
   storing the image data in a scanout buffer;
   capturing the scanout buffer to convert the image data to a texture;
   mapping the texture to at least one polygon to create a formatted image; and
   converting the formatted image to a serial digital interface format; and
   providing the encoded data to an image converter which generates signals representing at least HD-SDI at an SDI video output, alpha information at an alpha output and depth information at a Z-output.

17. The method of claim 16, wherein mapping the texture comprises applying the image data to the at least one polygon, wherein the at least one polygon comprises a plurality of vertices associated with a plurality of texture coordinates.

18. The method of claim 16, wherein converting the formatted image comprises formatting an image having a precision greater than as provided by an 8-bit red-green-blue ("RGB") color component.

19. A graphics system, comprising:
   a graphics subsystem having a scanout buffer, wherein the graphics subsystem is configured to generate an image data, store the image data in the scanout buffer, use the scanout buffer as a texture, and map the texture to at least one polygon to create a formatted image;
   the subsystem further including a transmit mode for converting the formatted image to a selectively encoded stream of data in any one of a plurality of video formats; and
   an image converter coupled to the graphics subsystem, wherein the image converter is configured to generate providing the encoded data to an image converter which generates signals representing at least HD-SDI at an SDI video output, alpha information at an alpha output and depth information at a z-output.

20. The system of claim 19, wherein the at least one polygon comprises a plurality of vertices associated with a plurality of texture coordinates.

21. The system of claim 19 wherein the image converter is further configured to receive and apply a prioritization listing establishing which of the image data is most important for video processing.

* * * * *